United States Patent [19]

Nickerson

[11] Patent Number: 4,606,553
[45] Date of Patent: Aug. 19, 1986

[54] MAP CONSTRUCTION

[75] Inventor: Roy Nickerson, Charlotte, N.C.

[73] Assignee: Royall Communications Incorporated, Charlotte, N.C.

[21] Appl. No.: 741,571

[22] Filed: Jun. 5, 1985

[51] Int. Cl.[4] .................. B42D 15/04; G09B 29/04; G09F 1/00
[52] U.S. Cl. ........................ 281/5; 283/34; 283/56
[58] Field of Search .............. 281/5, 23; 283/34, 56, 283/61

[56] References Cited

U.S. PATENT DOCUMENTS

| 805,016 | 11/1905 | Jones | 281/5 |
|---|---|---|---|
| 807,719 | 12/1906 | Burgy | 281/5 |
| 1,687,304 | 10/1928 | Morris | 281/5 |
| 2,572,460 | 10/1951 | Falk | 283/34 |
| 3,394,795 | 7/1968 | Thomas | 283/56 |

Primary Examiner—Paul A. Bell
Assistant Examiner—Paul M. Heyrana, Sr.
Attorney, Agent, or Firm—W. Thad Adams, III

[57] ABSTRACT

A sheet 20 on which a map is printed is attached to and folded within a matchbook-like cover 11. Sheet 20 is then folded in a first plurality of accordion folds (30–34) from side-to-side to expose a free, unfolded corner (21) for being grasped between the thumb and forefinger. Sheet 20 is then folded in a second plurality of accordion folds (23, 34). The folds are made in such a manner as to maintain the free, unfolded corner (21) in position to be grasped by the thumb and forefinger and pulled in a continuous movement diagonally against the direction of both the side-to-side folds (30–34) and the top-to-bottom folds (23, 24) simultaneously while holding the cover (11) in the other hand. To close the map, the sheet 20 is moved with the thumb and forefinger diagonally towards cover 11 to aid the sheet in reassuming its side-to-side folds (30–34) and top-to-bottom folds (23, 24) for storage within cover 11.

3 Claims, 11 Drawing Figures

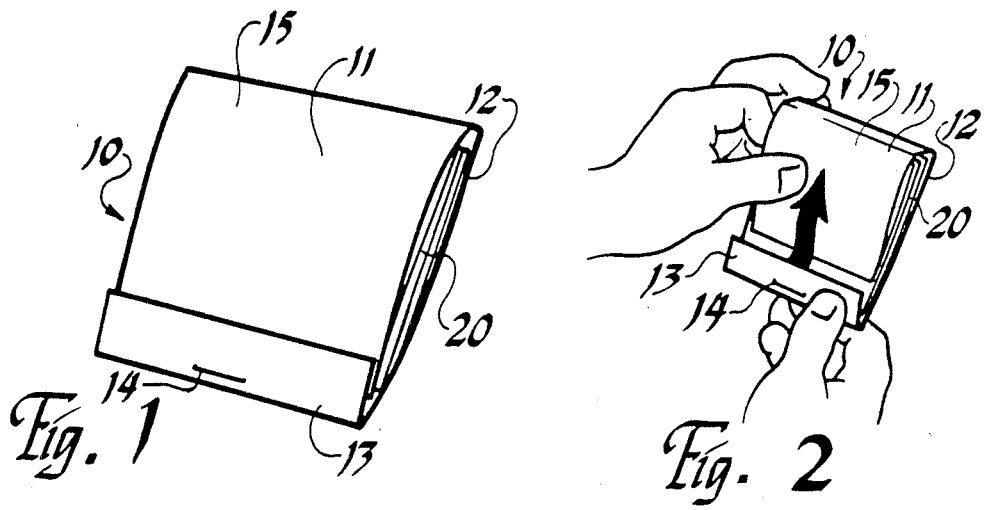
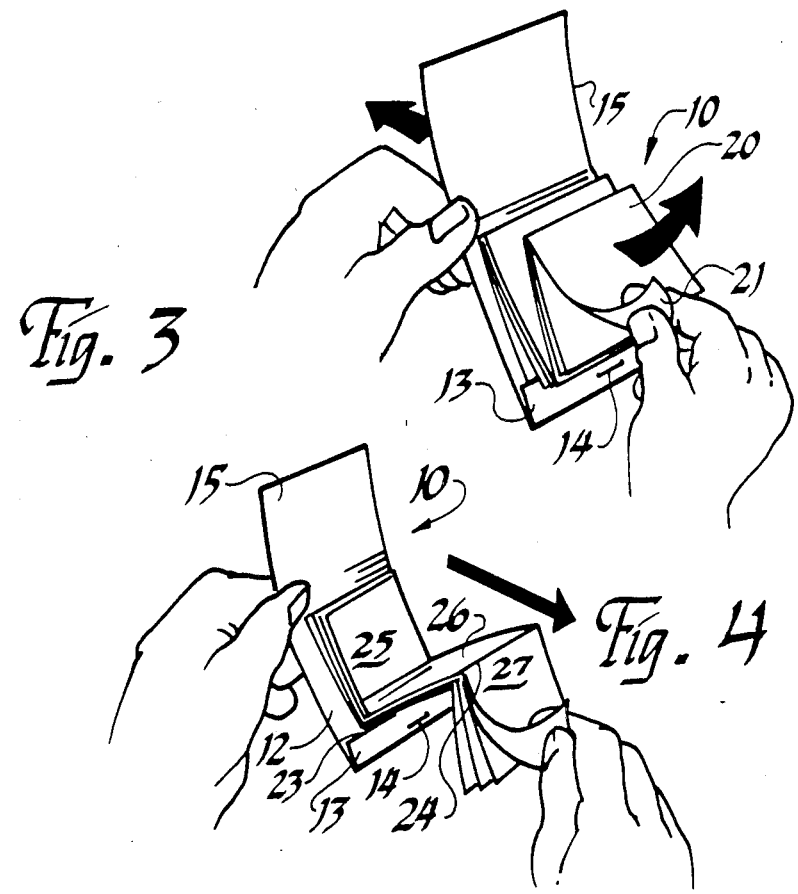

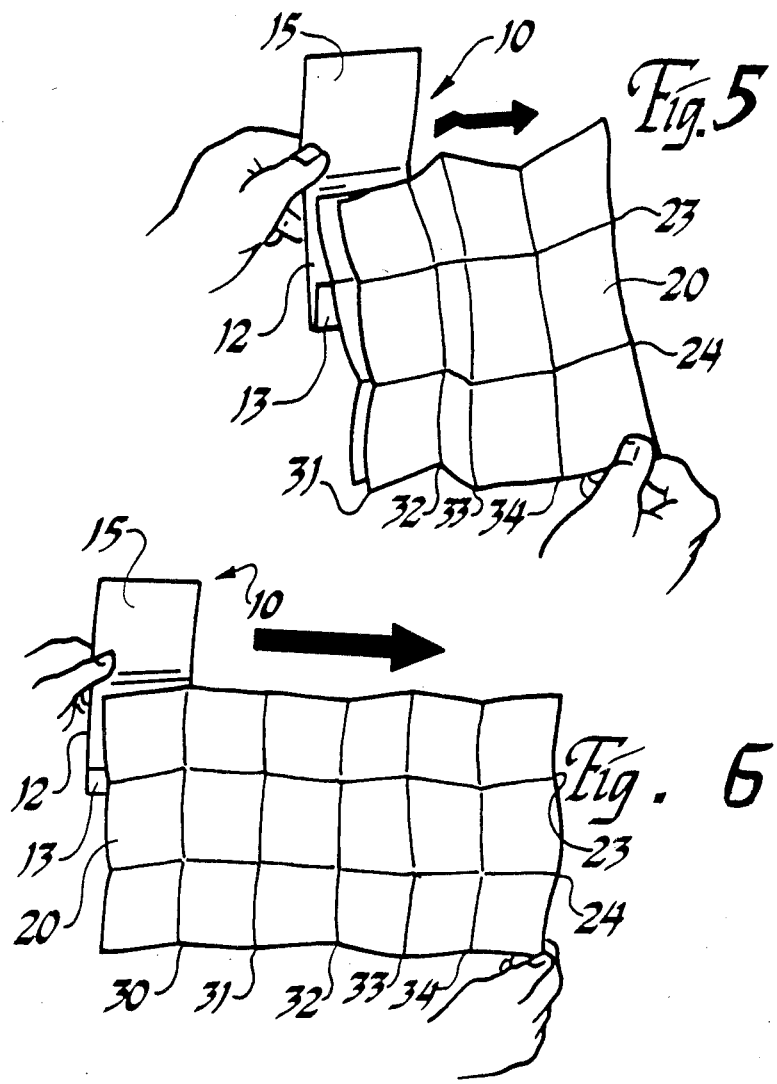
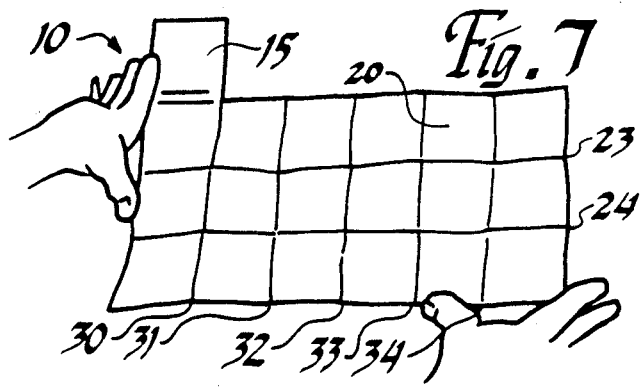

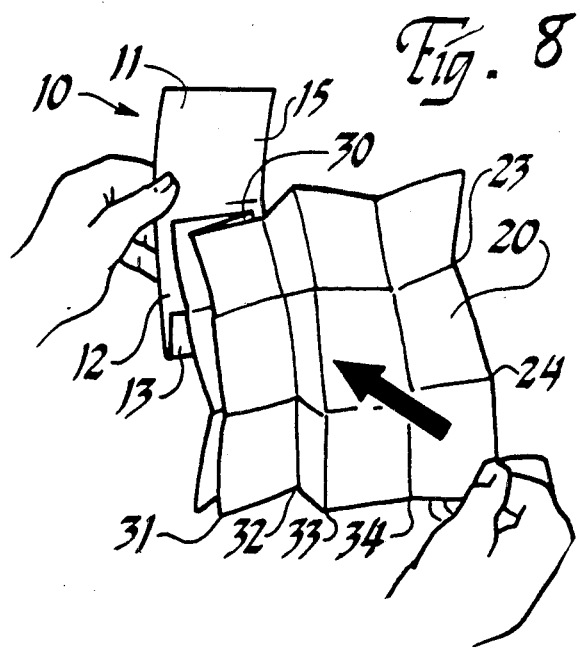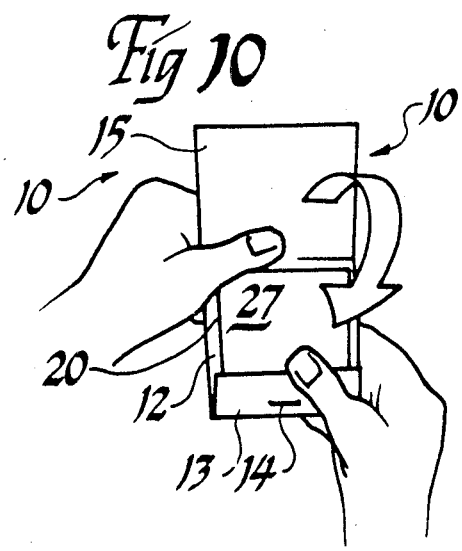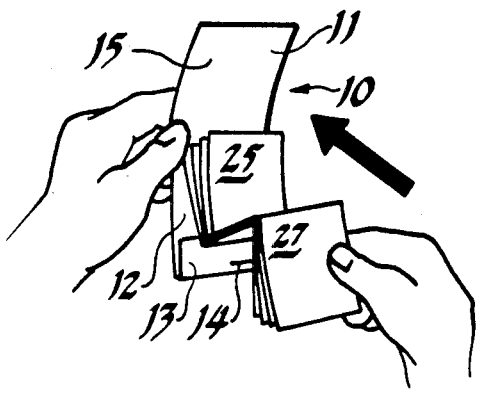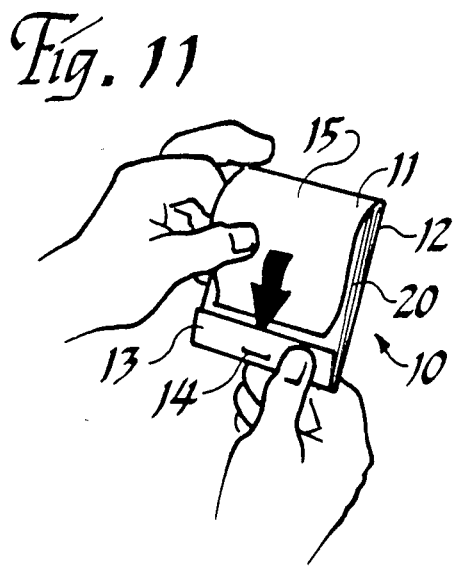

MAP CONSTRUCTION

TECHNICAL FIELD AND BACKGROUND OF THE INVENTION

This invention relates to a map construction particularly adapted to be easily unfolded for use and refolded for storage.

More specifically, this invention relates to a relatively small-sized map which is designed specifically to be enclosed within a cover which closely resembles an oversized book of matches. The map is particularly convenient for carrying in the pocket or in an automobile since, when folded, it occupies very little space. In addition, the map is particularly well adapted for point-of-purchase display and sale at service stations and at drug and grocery store checkout lines.

Generally, prior art maps are folded by means of a number of folds, some of which fold in one direction and others in the opposite direction. As a result, unfolding the map requires a series of individual hand movements. Also, it is often quite difficult to refold the map in exactly the same way it was originally folded, especially after the map has been opened for a period of time and, possibly, even refolded in a different way to reduce the size of the map to a size more suitable for use inside a vehicle.

SUMMARY OF THE INVENTION

Therefore, it is an object of the invention to provide a map construction which includes a map easily folded within a protective cover.

It is another object of the invention to provide a map which is easily unfolded for use and easily refolded for storage, when desired.

These and other objects and advantages of the present invention are achieved in the preferred embodiment disclosed below by providing a foldable, matchbook-like cover and a foldable, paper sheet on which the map is printed, which sheet is fastened by one corner to the cover.

The sheet on which the map is printed is folded in a first plurality of accordion folds from side-to-side to expose a free, unfolded corner for being grasped between the thumb and forefinger. The sheet is then folded in a second plurality of accordion folds from top-to-bottom. The number and size of the side-to-side and top-to-bottom folds are sufficient to reduce the size of the sheet so that the sheet fits within the perimeter of the cover and is enclosed within the cover when the sheet is fully folded. The folds are made in such a manner as to maintain the free, unfolded corner in position to be grasped by the thumb and forefinger and pulled in a continuous movement diagonally against the direction of both the side-to-side and top-to-bottom folds simultaneously while holding the cover in the other hand.

The sheet is closed by moving the sheet with the thumb and forefinger diagonally towards the cover to aid the sheet in reassuming its side-to-side and top-to-bottom folds for storage within the cover.

According to a preferred embodiment of the invention, the sheet includes five side-to-side folds for defining six alternately folded side-by-side panels. According to the same preferred embodiment of the invention, the sheet includes two top-to-bottom folds for defining three vertically positioned fold panels.

According to a preferred embodiment of the invention, the unfolded free corner is positioned on the outermost, lower left-hand side of the folded sheet and is adapted to be grasped by the right thumb and forefinger and pulled diagonally in the lower right-hand direction for unfolding the sheet, while holding the cover in the left hand.

BRIEF DESCRIPTION OF THE DRAWINGS

FIGS. 1-6 are step-by-step, perspective views of the manner in which the cover is opened and the map is unfolded;

FIG. 7 is a view of the map in its unfolded, flat configuration; and

FIGS. 8-11 are step-by-step views of the manner in which the map is refolded and closed within the cover.

DESCRIPTION OF THE PREFERRED EMBODIMENT

Referring now specifically to the drawings, a preferred embodiment of the map construction according to the invention is illustrated and generally designated at broad reference numeral 10. The map construction comprises a cover 11 which is constructed in the same manner as a matchbook cover. Specifically, cover 11 includes a back cover 12 which is folded in relatively closely spaced-apart relation to its bottom side to define a flap 13. Flap 13 is stapled to back cover 12 by means of a staple 14. Cover 11 is folded at its approximate mid-point to define a front cover 15, the free end of which is tucked beneath flap 13 when closed. A sheet 20 is shown folded within cover 11 in FIG. 1.

Referring now to FIG. 2, sheet 20 on which the map is printed is exposed for use by first lifting the front cover 15 away from flap 13.

As is shown in FIG. 3, the front cover 15 is folded back out of the way of sheet 20. Cover 11 is held in the left hand and a free, unfolded corner 21 of sheet 20 is grasped between the thumb and forefinger of the right hand. The sheet is pulled outwardly away from cover 11, and as can be seen, sheet 20 begins unfolding in an accordion-like fashion.

This process continues, as is shown in FIG. 4. Sheet 20 is folded twice with two vertically spaced-apart top-to-bottom folds 23 and 24, which define three vertically positioned fold panels 25, 26 and 27. As the vertical fold panels 25, 26 and 27 are extended, the hand continues to pull the sheet away from cover 11 in the lower right-hand direction. As the vertical fold panels 25, 26 and 27 are extended, the sheet 20 begins unfolding in the horizontal direction. As is shown in FIGS. 5 and 6, sheet 20 is folded with five side-to-side alternating accordion folds 30-34, inclusive. Together with the two vertical folds 23 and 24, sheet 20 is thereby divided by these folds into eighteen rectangular fold panels.

As is best shown in FIGS. 5 and 6, sheet 20 is attached with double sided tape or a suitable adhesive by its upper left-hand corner to the inside of cover 11.

Referring now to FIG. 7, the map in its completely unfolded condition can be spread and placed on a flat surface, or held in the hand for use. Cover 11 is completely out of the way and does not interfere in any respect with the use of the map.

This construction is intended primarily for smaller-sized maps on the order of approximately 12 inches (30.5 centimeters) by 9 inches (21 centimeters). This size, combined with use of a 60 pound opaque offset paper permits the natural "spring" of the paper to overcome the weight of the paper and create the tendency for the map to be self-closing. This is illustrated in the figures beginning with FIG. 8.

When use of the map is complete and refolding for storage in the cover 11 is desired, the same free, unfolded corner 21 is grasped between the thumb and forefinger. By pushing sheet 20 in an upwardly diagonal direction, sheet 20 refolds itself, first along vertical folds 30-34, inclusive. As these folds are completed, sheet 20 is then refolded along folds 23 and 24 as movement of the map towards cover 11 continues. When the map is completely folded within cover 11, front cover 15 is folded downwardly and its free edge tucked under 13. Of course, many changes can be made to the preferred embodiment disclosed above without departing substantially from the spirit of the invention. For example, the number of vertical and horizontal folds can be varied depending upon the size of the map and the type paper from which it is constructed. Likewise, it can be folded in such a manner that it is unfolded from right to left rather than from left to right as is shown in the drawings. In fact, sheet 20 can be suitably unfolded and refolded with the free, unfolded corner at any of the four outermost corners of the completely folded map.

Finally, the "spring" which assists sheet 20 to close is a function of the type of paper in relation to the size of the map. Generally speaking, a heavier paper is required as the size of the map increases and vice versa. In each case a type of paper, as described above, should be selected which has resistance to multiple folding, which resistance will permit the map to be unfolded and refolded many times.

A map construcion is described above. Various details of the invention may be changed without departing from its scope. Furthermore, the foregoing description of the preferred embodiment of a map construction according to the present invention is provided for the purpose of illutration only and not for the purpose of limitation—the invention being defined by the claims.

I claim:

1. A map construction adapted to be unfolded for use in a single, continuous, manual movement and refolded in a single, continuous manual movement when desired, said map construction comprising:
   a. a foldable single sheet, matchbook-like cover; and
   b. a foldable, imperforate, paper sheet fastened by one corner thereof to said cover and folded in a first plurality of accordion folds from side-to-side to expose a free, unfolded corner for being grasped between the thumb and forefinger, and then folded in a second plurality of accordion folds from top to bottom, the number and size of said side-to-side and top-to-bottom folds being sufficient to reduce the size of said sheet to within the perimeter of said cover for being enclosed therein when said sheet is fully folded in a folded configuration wherein the perimeter of the folded sheet is the size of a single panel of the sheet defined by the intersection of the top-to-bottom and side-to-side folds, said folds being made in such manner as to maintain said free, unfolded corner in position to be grasped by the thumb and forefinger and pulled in a continuous movement diagonally against the direction of both the side-to-side and top-to-bottom folds simultaneously while holding the cover in the other hand, whereby the sheet is spread to its open position for use; and to close, by moving the sheet with the thumb and forefinger diagonally towards the cover to aid said sheet in reassuming its side-to-side and top-to-bottom folds for storage within said cover.

2. A map construction according to claim 1, wherein said sheet includes five side-to-side folds for defining six alternately folded side-by-side panels and further, wherein said sheet includes two top-to-bottom folds for defining three vertically positioned fold panels.

3. A map construction according to claim 1, wherein said unfolded free corner is positioned on the outermost lower left hand side of said folded sheet and adapted to be grasped by the right thumb and forefinger and pulled diagonally in the lower right-hand direction for unfolding said sheet.

* * * * *